(12) United States Patent
Harding et al.

(10) Patent No.: US 7,923,094 B1
(45) Date of Patent: *Apr. 12, 2011

(54) LAMINATED BALLISTIC SHEET

(75) Inventors: Kenneth C. Harding, Midlothian, VA (US); Gene C. Weedon, Richmond, VA (US); Joe Mitchell, Concord, NC (US); Lisa Owen, Charlotte, NC (US)

(73) Assignee: BAE Systems Tensylon High Performance Materials, Inc., Monroe, NC (US)

( * ) Notice: Subject to any disclaimer, the term of this patent is extended or adjusted under 35 U.S.C. 154(b) by 135 days.

This patent is subject to a terminal disclaimer.

(21) Appl. No.: 12/313,946

(22) Filed: Nov. 26, 2008

Related U.S. Application Data

(63) Continuation-in-part of application No. 11/881,863, filed on Jul. 30, 2007, and a continuation-in-part of application No. 11/787,094, filed on Apr. 13, 2007, and a continuation-in-part of application No. 11/787,260, filed on Apr. 13, 2007.

(51) Int. Cl.
- *B29C 65/00* (2006.01)
- *B32B 37/10* (2006.01)
- *B32B 37/22* (2006.01)

(52) U.S. Cl. .................... 428/156; 139/383 R; 156/164; 156/194; 156/304.6; 428/107; 428/213; 428/364; 429/144

(58) Field of Classification Search ................. 428/156, 428/107, 213, 364; 139/383; 429/144; 156/164, 156/194, 304.6

See application file for complete search history.

(56) References Cited

U.S. PATENT DOCUMENTS

| | | | |
|---|---|---|---|
| 4,879,076 A | 11/1989 | Sano et al. | |
| 4,931,126 A * | 6/1990 | McCarville et al. | 156/304.6 |
| 5,091,133 A | 2/1992 | Kobayashi et al. | |
| 5,106,555 A | 4/1992 | Kobayashi et al. | |
| 5,106,558 A | 4/1992 | Kobayashi et al. | |
| 5,200,129 A | 4/1993 | Kobayashi et al. | |
| 5,578,373 A | 11/1996 | Kobayashi et al. | |
| 6,539,983 B2 * | 4/2003 | Khokar | 139/383 A |
| 6,951,685 B1 | 10/2005 | Weedon et al. | |
| 2005/0197020 A1 * | 9/2005 | Park et al. | 442/36 |

FOREIGN PATENT DOCUMENTS

EP 1627719 A1 * 2/2006

* cited by examiner

*Primary Examiner* — Brent T O'Hern

(57) ABSTRACT

A non-woven ballistic material that demonstrates exceptional ballistic properties which ballistic material is fabricated by the lamination or angular lamination of a plurality of wide sheets of UHMWPE comprising a plurality of strips of highly oriented ultra high molecular weight polyethylene partially overlapped or abutted longitudinally to define joints between adjoining strips wherein the thickness of the joint is less than about 80% of the thickness of the sum of the thicknesses of the adjoining strips that make up the joint.

4 Claims, 6 Drawing Sheets

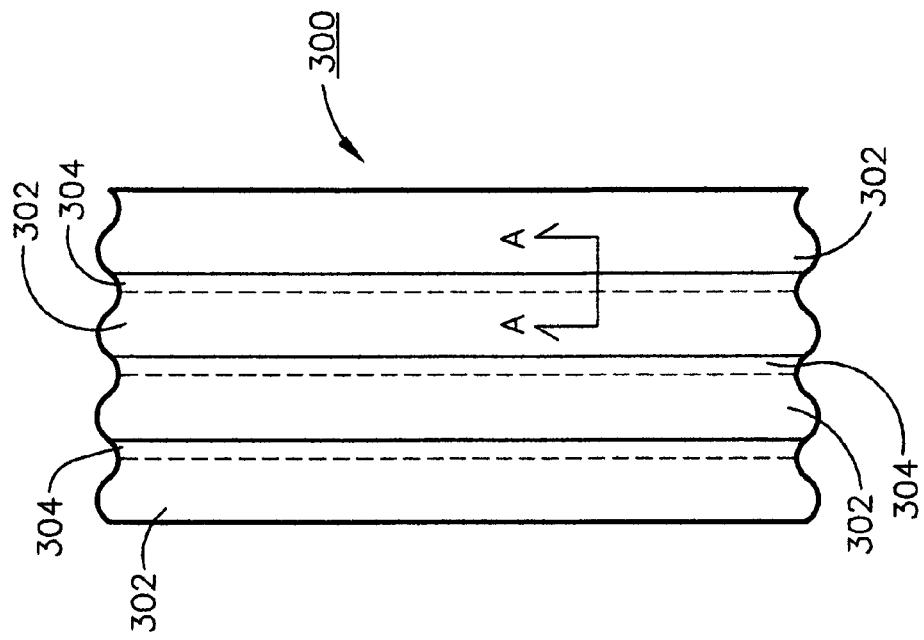
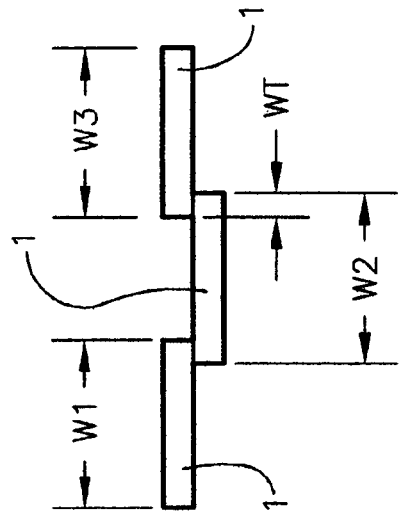
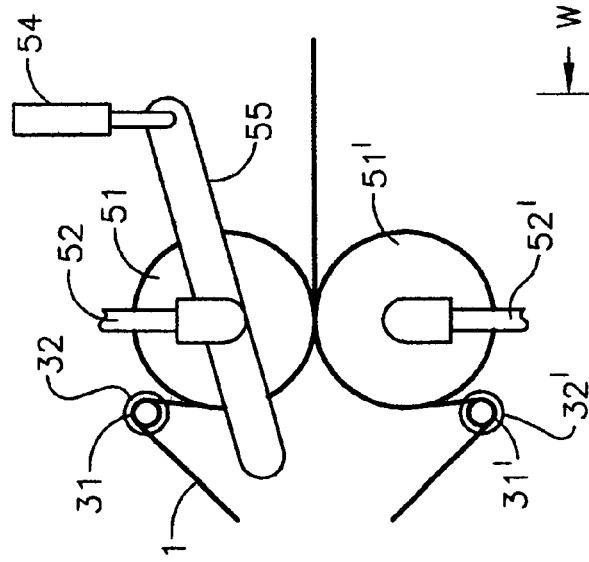

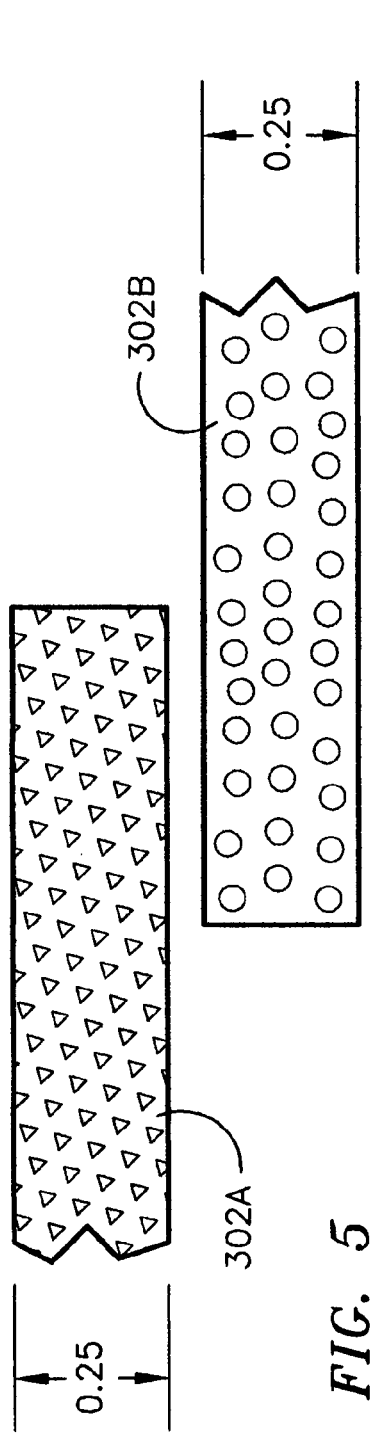
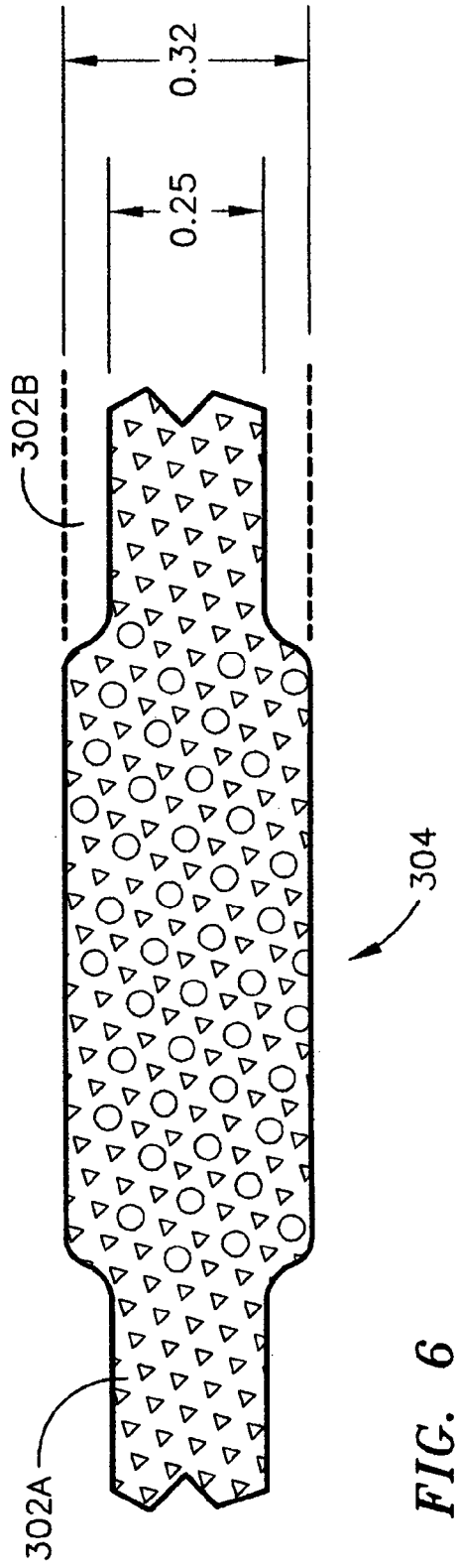
FIG. 5
FIG. 6

LAMINATED BALLISTIC SHEET

This application is a continuation-in-part of U.S. patent application Ser. No. 11/787,094 filed Apr. 13, 2007, U.S. patent application Ser. No. 11/881,863 filed Jul. 30, 2007 and U.S. patent application Ser. No. 11/787,260 filed Apr. 13, 2007 all copending herewith.

FIELD OF THE INVENTION

The present invention relates to laminated ballistic sheet and more particularly to such materials that are fabricated by the lamination of sheets formed of strips or tapes of ultra high molecular weight polyethylene (UHMWPE) that have been joined to form sheets and subsequently laminated.

BACKGROUND OF THE INVENTION

U.S. patent application Ser. No. 11/787,094 describes a wide sheet of highly oriented ultra high molecular weight polyethylene comprising a plurality of strips of highly oriented ultra high molecular weight polyethylene partially overlapped or abutted longitudinally to define joints between adjoining strips wherein the thickness of the joint is less than about 80% of the thickness of the sum of the thicknesses of the adjoining strips that make up the joint. A continuous method for the production of such materials comprising subjecting longitudinally overlapping or abutted strips of these materials to temperatures below the melting point of the UHMWPE and pressures over 300 pli is also disclosed in this application.

U.S. patent application Ser. No. 11/787,260 describes apparatus for the continuous fabrication of wide polymer sheet from a plurality of polymer strips of indeterminate length abutting or partially overlapped longitudinally to define joints between adjoining strips.

U.S. patent application Ser. No. 11/881,863 describes a ballistic-resistant panel in which the entire panel or a strike-face portion thereof is formed of a plurality of sheets of high modulus high molecular weight polyethylene tape. The sheets of high modulus polyethylene tape can be in the form of cross-plied laminated layers of tape strips or a woven fabric of tape strips. The strips of UHMWPE tape include a width of at least one inch and a modulus of greater than 1400 grams per denier. The ballistic-resistant panel may include a backing layer of conventional high modulus fibers embedded in resin. A wide variety of adhesives were found acceptable for bonding the cross-plied layers of high modulus polyethylene tape together for forming the ballistic-resistant panels according to this disclosure.

While each of these pending applications describes highly useful materials and methods and apparatus for their fabrication, none describes a ballistic laminate fabricated from a wide sheet of highly oriented ultra high molecular weight polyethylene comprising a plurality of strips of highly oriented ultra high molecular weight polyethylene partially overlapped or abutted longitudinally to define joints between adjoining strips wherein the thickness of the joint is less than about 80% of the thickness of the sum of the thicknesses of the adjoining strips that make up the joint.

Accordingly, there remains an opportunity to provide a ballistic laminate fabricated from the wide sheet product described in U.S. patent application Ser. No. 11/787,094.

OBJECT OF THE INVENTION

It is therefore an object of the present invention to provide a UHMWPE ballistic laminate that exhibits exceptional ballistic properties.

SUMMARY OF THE INVENTION

According to the present invention there is provided a non-woven ballistic material that demonstrates exceptional ballistic properties which ballistic material is fabricated by the lamination or angular lamination of a plurality of wide sheets of UHMWPE comprising a plurality of strips of highly oriented ultra high molecular weight polyethylene partially overlapped or abutted longitudinally to define joints between adjoining strips wherein the thickness of the joint is less than about 80% of the thickness of the sum of the thicknesses of the adjoining strips that make up the joint.

DESCRIPTION OF THE DRAWINGS

FIG. 3 is a schematic side view of the calendar roll stand portion of the apparatus useful in the fabrication of the wide sheet ballistic materials useful in the successful practice of the present invention.

FIG. 4 is a schematic partial top view of a portion of the initial and final alignment guide zones of the apparatus useful in the fabrication of the wide sheet ballistic materials useful in the successful practice of the present invention.

FIG. 5 is a cross-sectional view of the overlap area between two adjoining narrow strips of highly oriented UHMWPE prior to bonding in accordance with the practice described in U.S. patent application Ser. No. 11/787,094

FIG. 6 is a cross-sectional representation of the joint volume between two highly oriented UHMWPE tapes after treatment in accordance with the method described in U.S. patent application Ser. No. 11/787,094

FIG. 7 is a partially phantom top plan view of the UHMWPE wide sheet of U.S. patent application Ser. No. 11/787,094 prior to processing in accordance with the method described in that application.

DETAILED DESCRIPTION

Figure 1:
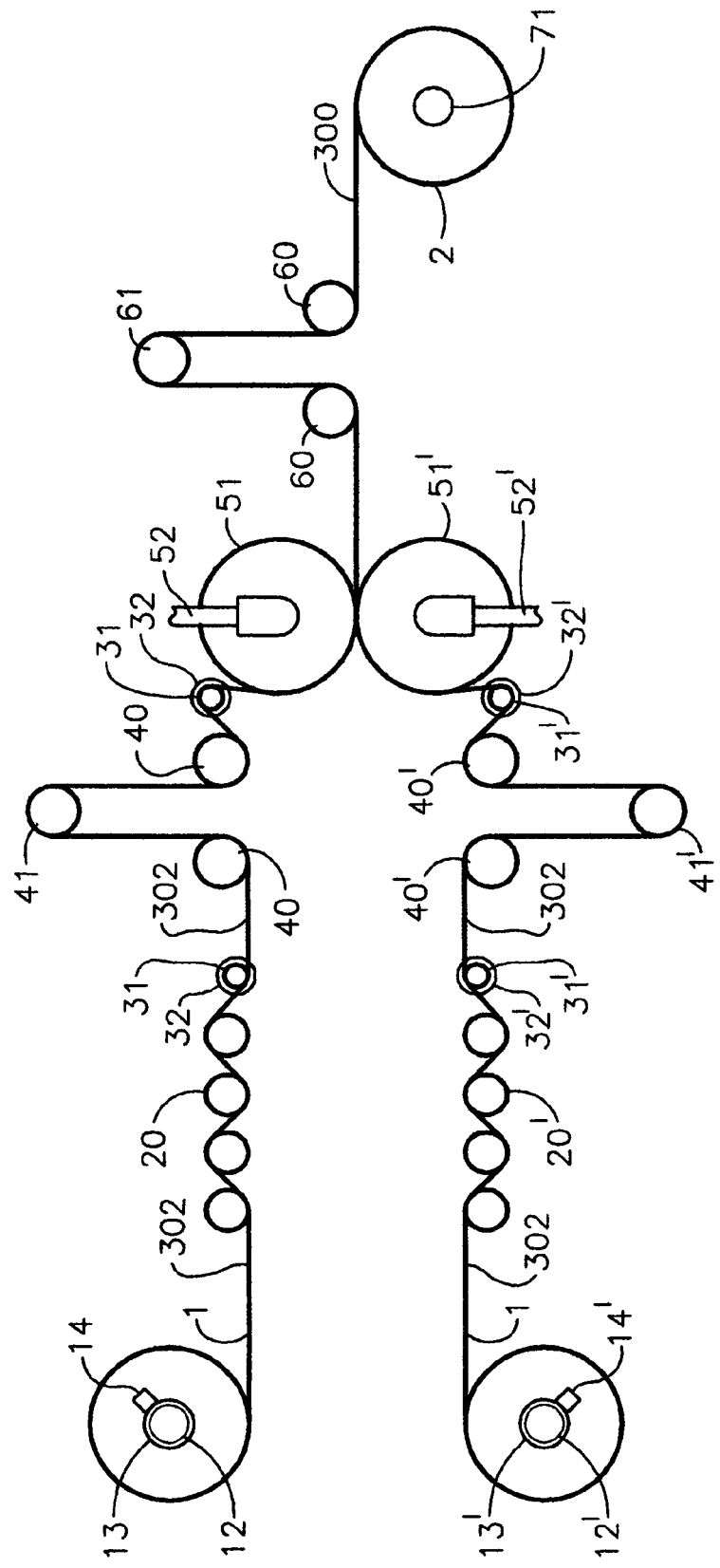
FIG. 1 is a schematic side view of the apparatus useful in the fabrication of the wide sheet ballistic materials useful in the successful practice of the present invention.

As used herein, the terms "substantially flat", "essentially flat" and "substantially pure" are meant and intended to have the following meanings: "substantially flat" refers to sheet material in accordance with the present invention wherein a joint between two adjoining strips of material has a thickness that is not greater than 80% of the combined thicknesses of the adjoining/overlapping/abutting strips; "essentially flat" refers to sheet material in accordance with the present invention wherein a joint between two adjoining strips is essentially the same thickness as that of the strips being joined with little if any thickness difference therebetween; and "substantially pure" refers to UHMWPE that contains no foreign materials or substances that negatively affect the properties of the UHMWPE except as artifacts of the UHMWPE production process such as catalysts, etc. As used in this application, the term "high modulus" refers to materials having a modulus greater than 1,000 grams per denier (gpd).

The starting material UHMWPE wide sheets of the present invention are those fabricated as described in aforementioned U.S. patent application Ser. No. 11/787,094 (hereinafter the '094 application) which is incorporated herein by reference in its entirety from strips of UHMWPE prepared in accordance with the methods described in the following U.S. Pat. Nos. 6,951,685; 4,879076; 5,091,133; 5,106,555; 5,106,558; and 5,578,373 the teachings of which are all incorporated herein by reference in their entireties. Particularly preferred as the starting materials are the UHMWPE materials prepared as described in U.S. patent application Ser. Nos. 11/880,520, 12/080,197 and 12/287,799 and U.S. Pat. No. 5,200,129. Such materials comprise highly oriented UHMWPE of high purity.

According to the process described in the aforementioned '094 application, wide UHMWPE sheet is produced by a process that comprises calendering an array of overlapping or abutting strips of indeterminate length prepared as described in the recited prior art at a temperature below the melting point of the UHMWPE, generally in a range of between about 120° C. and about 155° C. (depending upon the tension applied to the strips during bonding as described below) at a pressure above about 300 pounds per lineal inch (pli) and under a tension of between about 0.3 grams/denier and about 5 grams/denier. The calendering apparatus and detailed description of the method for the production of these wide sheets are depicted and described in U.S. patent application Ser. No. 11/787,260 (the '260 application hereinafter) which is incorporated herein by reference in its entirety.

Referring now to accompanying FIGS. 5-7, a first embodiment of the wide UHMWPE sheet of the present invention 300 comprises a series of parallel and overlapped tapes or strips 302 of indeterminate length. As used herein, in relation to this first preferred embodiment, the term "joint" is meant to define and refer to the overlapped areas/volumes 304 depicted n FIG. 6. As depicted in FIGS. 5, 6, 10 and 11, the molecules in two abutting or overlapping strips or tapes 302A and 302B are schematically depicted as triangles and circles to permit differentiation in the discussion that follows.

As depicted in FIGS. 5, 6 and 7, a first preferred embodiment of the wide sheet 300 of the wide sheet useful in the successful practice of the present invention is produced by overlaying an array of tapes or strips 302A, 302B etc. of whatever width in parallel longitudinal relationship and then subjecting them to the processing conditions in the apparatus described herein. As shown in FIG. 5, in one embodiment, each of overlaying strips or tapes 302A and 302B is 0.0025 inches in thickness and the molecules (schematically represented as triangles and circles) are in each of separate strips or tapes 302A and 302B. As shown in FIG. 6, once the overlapping structure has been subjected to the process conditions described herein, the total thickness of the joint 304 is about 0.0032 inches, a total reduction of more than about 35% and the molecules have been intermingled, in this case most probably entangled to provide a joint 304 that exhibits a higher strength than the parent material as well as a higher modulus. The thicknesses of strips or tapes 302A and 302B just mentioned are used for demonstration purposes only, it being clearly contemplated that thicker or thinner strips 302A and 320B could be equally well used to for the UHMWPE wide sheet described herein. More particularly, strips having thicknesses between about 0.0010 inches and 0.01 inches, for example, could be equally well used to form the wide sheet of the present invention assuming the availability of suitable calendaring equipment. Strips in the range of between about 0.0015 and about 0.007 inches in thickness are specifically preferred for use in the successful practice of the present invention. It should be noted that such thickness reduction in joint area 304 and the intermingling of the molecules of each of the parent strips or tapes 302A and 302B can only be accomplished with the application of the pressures described herein. Subjection of the overlapping structure to lower pressures, as described in the prior art, does not achieve the thickness reduction and molecular commingling of the present invention or the strength and modulus increases resulting therefrom. The attainment of these enhancements and their presence clearly and unequivocally distinguish the wide sheet described herein from those of the prior art.

Figure 10:
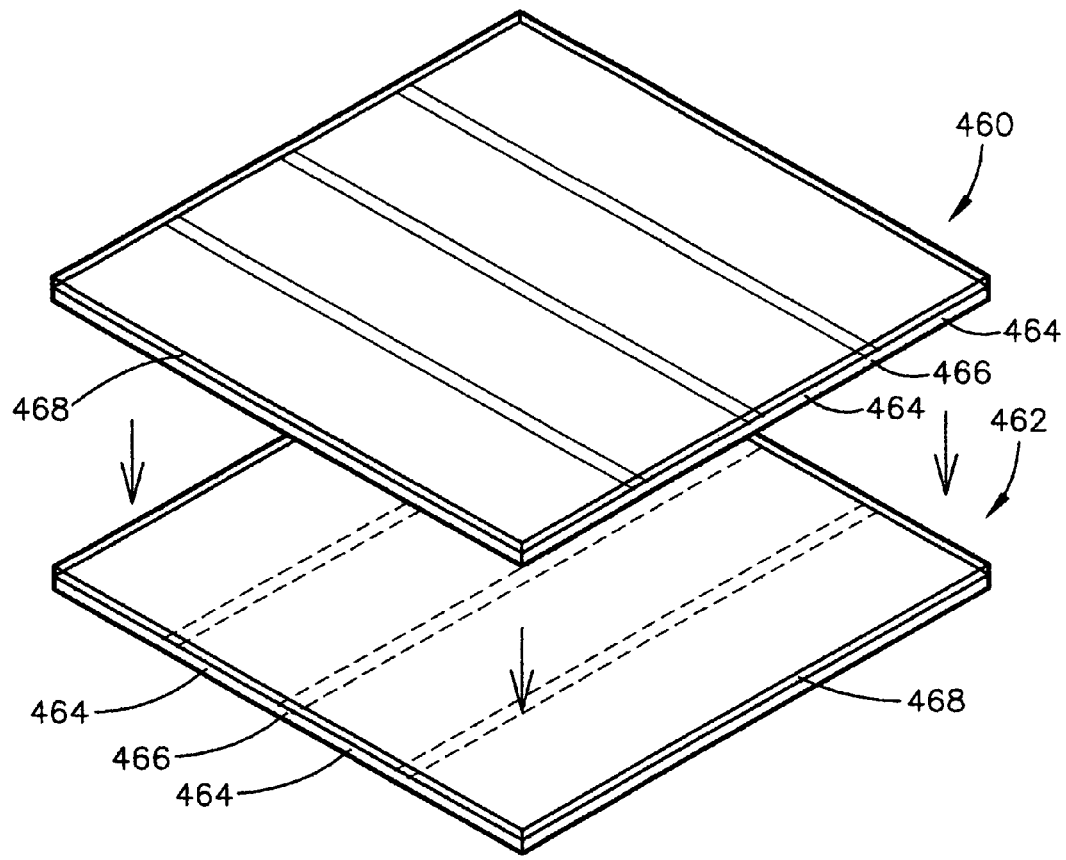
FIG. 10 is a schematic representation in perspective view of two sheets or layers of adhesive-coated unidirectional non-fibrous UHMWPE tape prior to being fused together with heat and pressure to form a cross-plied laminate for use in the construction of a ballistic laminate according to the present invention.
Figure 11:
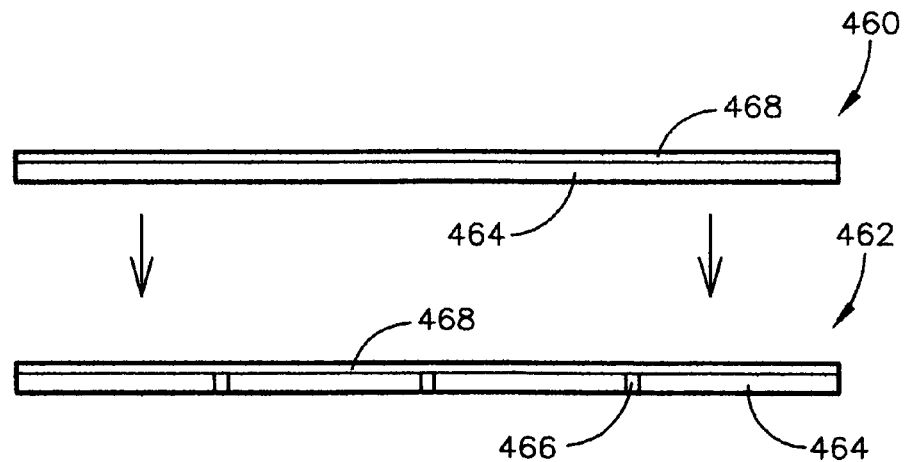
FIG. 11 is a schematic representation as viewed from the side of two sheets of unidirectional non-fibrous UHMWPE tape prior to being fused together with heat and pressure to form a cross-plied laminate.

FIGS. 10 and 11 depict cross-sectional views representing an alternative preferred embodiment of the UHMWPE wide sheet useful in the successful practice of the present invention As shown in FIG. 10, according to this embodiment, two strips 302A and 302B of UHMWPE are butted together. The processing of this butted configuration under the processing conditions described herein and in the apparatus described in the '094 application results in the structure shown in FIG. 11 wherein each of strips 302A and 302B has undergone a degree of "side extrusion", i.e. the longitudinal edges of each of the strips has been blended with the longitudinal edge of the abutting strip to form a joint area/volume 304 defined by the merger of the molecules of each of the member strips depicted as circles and triangles for differentiation purposes in these two Figures. This product wide sheet is fabricated by laying up an array of longitudinally abutting strips of UHMWPE and subjecting the array thus formed to the processing conditions described herein in an apparatus similar to that described in the '094 application with the exception that instead of overlaying neighboring strips of UHMWPE the strips are butted against each other prior to processing. Under these conditions, the abutting strips undergo side extrusion forcing the neighboring edges into each other to provide the structure depicted in FIG. 11. As can be envisioned and as depicted in FIG. 11, this wide sheet comprises an essentially flat sheet with little or no thickness difference in joint area/volume 304.

Figure 2:
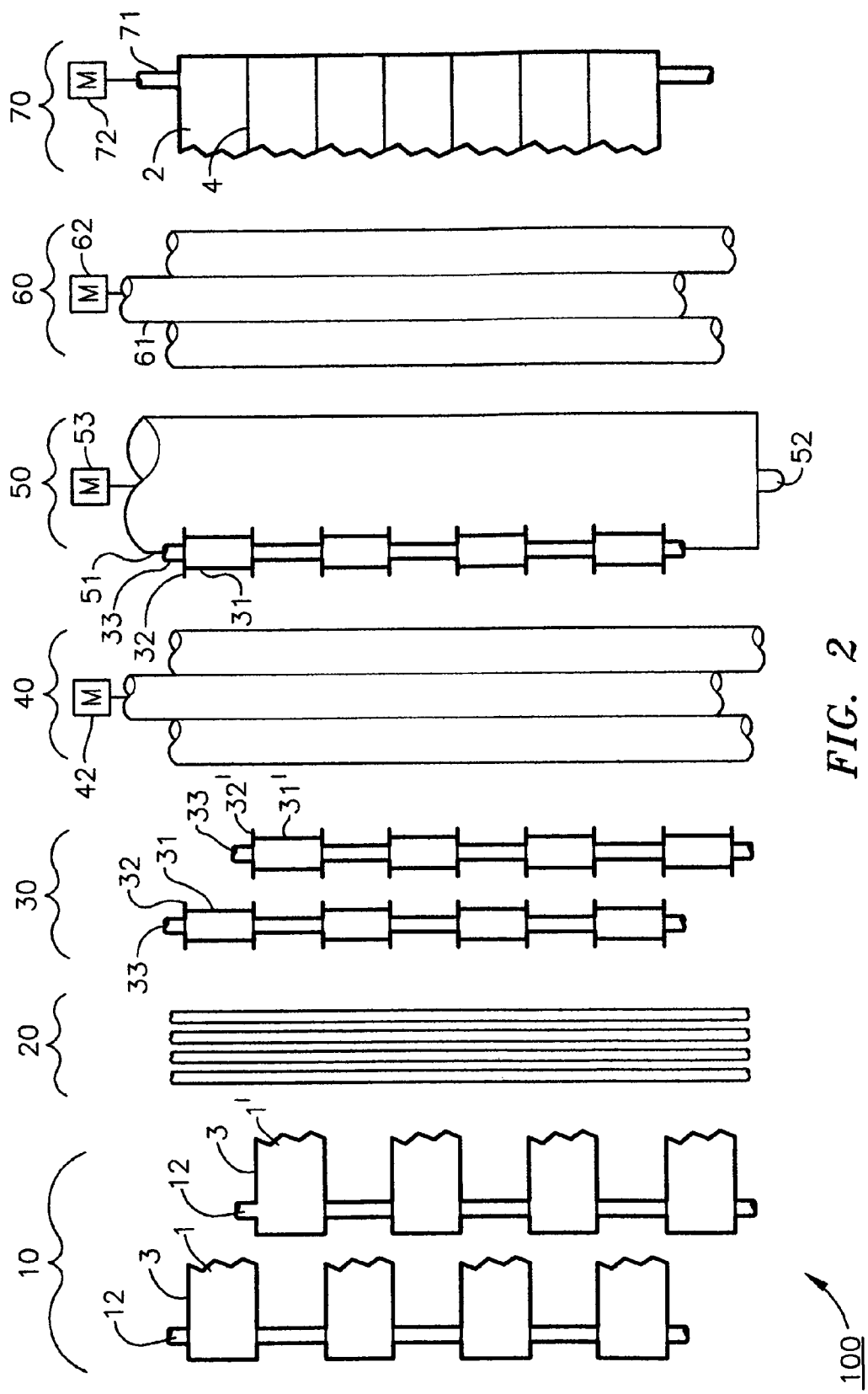
FIG. 2 is a schematic top view of the apparatus useful in the fabrication of the wide sheet ballistic materials useful in the successful practice of the present invention.
Figure 8:
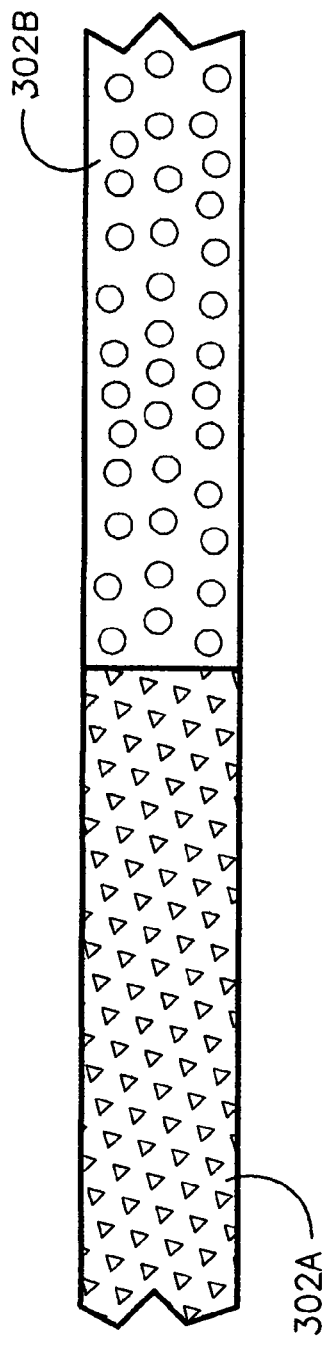
FIGS. 8 and 9 are cross-sectional views depicting an alternative preferred embodiment of the wide sheet described in U.S. patent application Ser. No. 11/787,094 and useful in the successful practice of the present invention.
Figure 9:
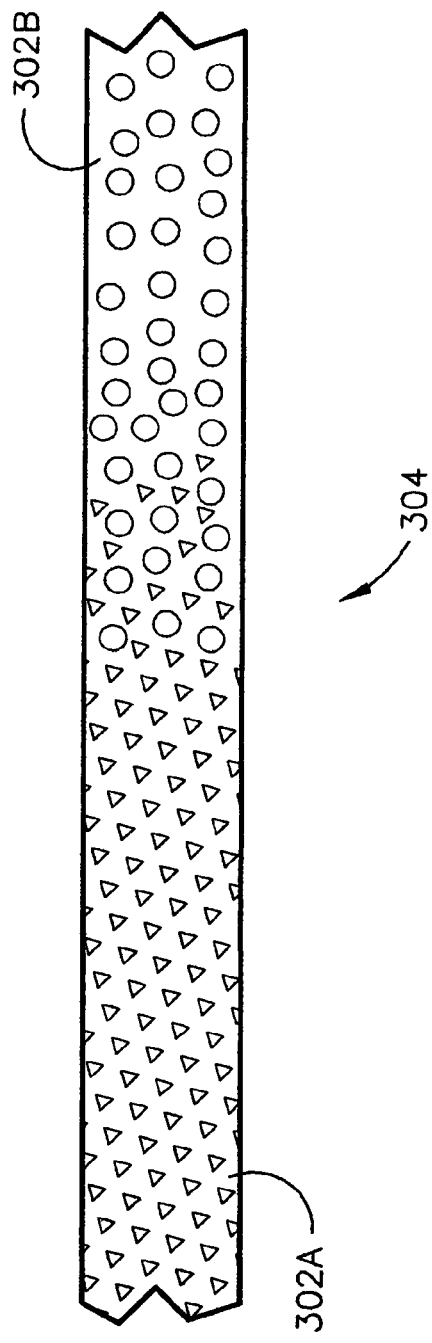

Referring now to FIGS. 1-3, the apparatus utilized in accordance with the present invention to obtain the wide ballistic sheet useful in the present invention comprises seven discrete zones 10-70 as depicted in FIG. 1. Zone 10 is the feedstock payoff zone, zone 20 comprises a tension control zone that helps develop tension (other means are of course possible such as the inclusion of additional rollers), zone 30 is the initial and final alignment guide zone, zone 40 is a motor driven roll stand that imparts pulling energy to draw material through apparatus 1, zone 50 comprises the calender rolls that apply heat and pressure to bond the strips 01 of overlapped material, zone 60 comprises a motor driven roll stand that pulls the overlapped material from the calender and feeds it to the take up stand or zone 70.

Individual rolls of material 01 and 01' (shown as element 302 in FIGS. 5, 6 and 7) are mounted on shafts 12 and 12' to support them for unrolling and to place them in staggered relationship. The material on each of individual rolls 1 has an edge 3 and the edges 03 on staggered rolls 01 and 01' are oriented so as to overlap slightly as shown in the accompanying Figures. A resistance mechanism 14 is applied to rolls 1 to control their rate of unwinding.

As material 302 exits feedstock payoff zone 10 it is passed through a series of bars 20 (best seen in FIG. 1) that serve to control tension as material 302 is pulled through the line by subsequent operations. As will be explained more fully below, tension control is very important to the successful practice of this method.

Upon exiting zone 20 material 302 enters zone 30 which comprises two sets of offset rolls 31 and 31' that include flanges 32 and 32' mounted upon adjustable shafts 33 and 33' that serve to direct the flow of material 302 into subsequent zone 40 and control the amount of overlap of material 302 as it enters this subsequent zone.

Zone 40 comprises a series of vertically offset rolls 40 and 40' that pull material 302 from feedstock rolls 01 and through zones 20 and 30. A motor 42 is provided to drive rolls 41 and 41'.

Zone 50 comprises a final set of guide rolls 31 including flanges 32 mounted on a shaft 33 which serve to provide final guidance of overlapped material 302 into calender zone 50. The overlapped materials at this point in the process and in accordance with this embodiment are shown generally in FIG. 4. As shown in this Figure three input strips 1 of widths W1, W2 and W3 are overlapped a distance WT. WT may vary widely from a small fraction of an inch upwards to an inch or two. The amount of overlap is not particularly significant and does not materially affect the process or the product produced thereby. Within calender zone 50 are located calender rolls 51 and 51' that supply the requisite pressure to overlapped material 302 as specified elsewhere herein and exiting zone 50 is wide ballistic sheet 300 comprising overlapped and intimately bound sections of material 302 as shown in FIG. 5. As depicted in FIG. 3, a lift bar 55 driven by cylinder 54 is provided to lift top roll 51 to permit threading of overlapped material 302 between calender rolls 51 and 51'.

After exiting zone 50 wide ballistic sheet 300 enters zone 60 which comprises an offset set of pull rolls 61 which serve to draw material through apparatus 100 under tension as described elsewhere herein. A motor 62 is provided to drive rolls 60.

In zone 70 wide ballistic sheet 300 is taken up and rerolled onto a shaft 71 driven by motor 72.

Referring now to FIG. 4, it can be seen that as material 01 enters the various guide rolls described hereinabove and more specifically guide rolls 31 proximate calender rolls 51 and 51', each has a specific width W1, W2 or W3 which are preferably all the same but could be different, and overlap as shown in FIG. 4 and also shown in greater detail in FIG. 7.

The processing conditions described herein, temperatures below the melting point of the UHMWPE strips, tensions in the range of from about 0.3 and about 5 grams/denier and pressures above about 300 pli, define an operating window whose parameters of temperature and tension are intimately interrelated. As is well known in the art of producing UHMWPE, as tension on a fiber or strip of UHMWPE the "melting point" i.e. the temperature at which the onset of melt can be detected, increases as tension increases on a fiber or strip. Thus while at a tension of 0.3 grams/denier a temperature of about 120° C. may be below the melt point of the UHMWPE strips, at a tension of 5 grams/denier a temperature of 154° C. may still be just below the melt point of the UHMWPE strips. Thus, this interrelationship of tension and temperature must be carefully considered and maintained in order to obtain the enhanced products of the present invention. The pressure element of the processing conditions, is largely independent of the tension and temperature relationship just described. According to various preferred embodiments of the processing conditions of the present invention, temperatures in the range of from about 125° C. and 150° C. and tensions in the range of from about 0.4 and about 4.5 grams/denier are specifically preferred. The speed at which the process can be operated successfully is dependent solely upon the rate at which heat can be imparted to the UHMWPE strips. As long as the strips can be brought to the proper temperature prior to introduction into the calender rolls, the process will be effective. Such more rapid heating could be through the use of a preheating oven, the use of larger calender rolls, multiple sets of calender rolls, the use of multiple calenders, etc.

UHMWPE wide sheet produced in accordance with the process described herein exhibit a remarkable degree of transparency, in excess of 30%, while those of the prior art prepared as described below exhibited the opacity of the parent strip materials. This is undoubtedly due to either the fact that at low temperatures the process of the prior art does not produce well consolidated or intimately commingled structures, thus, exhibiting the transparency of the parent material, while at higher temperatures melting occurs, as discussed in greater detail below, leading to the presence of voids in the melted areas that serve to diffuse light and result in increased opacity.

The significant measured properties are presented in Table 1 below:

TABLE 1

Adhesives Tested for effectiveness in bonding Tensylon tape into a ballistic laminate:

| Adhesive Code | Chemical Composition | Melt Temperatures (degrees C.) | Measured Coat Weight (gsm) |
|---|---|---|---|
| A1 | Polyamide | 100-115 | 6.2 |
| B1 | Polyolefin | 93-105 | 6.0 |
| C1 | Ethylene Vinyl Acetate Copolymer | 98-112 | 4.7 |
| D1 | Polyurethane | 70-100 | 16.7 |
| E1 | Ethylene Acrylic Acid Copolymer | 88-105 | N/A |
| F1 | Polystyrene Isoprene Copolymer | N/A | 6.0 |
| G1 | Polyamide | N/A | 5.0 |
| H1 | Polyurethane | N/A | 5.0 |

The adhesives tested included Polyethylene-PO4401 (A1), Polyethylene-PO4605 (B1), Polyethylene-DO184B (C1), Polyurethane-DO187H (D1), and Polyethylene-DO188Q (E1), which are all available from Spunfab, Ltd. of Cayahoga Falls, Ohio; Kraton D1161P (F1), which is available from Kraton Polymers U.S., LLC of Houston, Tex.; Macromelt 6900 (G1), which is available from Henkel Adhesives of Elgin, Ill.; and Noveon-Estane 5703 (H1), which is available from Lubrizol Advanced Materials, Inc. of Cleveland, Ohio as well as material prepared in accordance with the practices described in U.S. patent application Ser. No. 11/881,863. Adhesives A1 through E1 were applied to the Tensylon tape by the laminator/fuser 20 depicted in FIG. 1 of U.S. patent application Ser. No. 11/881,863. Adhesives F1 through H1, which were dispersed in solvents, were coated on a release film and then transferred to one side of the UHMWPE tape.

The adhesive-coated unidirectional non-fibrous, high modulus, ultra high molecular weight polyethylene tape, commonly termed "unitape" and consisting of eight strips of UHMWPE tape fused at their edges, was then cut into 12-inch by 12-inch sheets. FIGS. 10 and 11 depict two sheets 460 and 462 of adhesive-coated unitape consisting of strips of UHMWPE tape 464 fused at joint areas 466. The joint areas 466 are depicted for clarity in describing the direction of orientation of the UHMWPE tape in FIG. 10, it should be understood that the UHMWPE tape strips 464 are rendered substantially transparent when bonded as described herein therefore making the joint areas 466 appear homogenous with the sheet. The bonding of non-fibrous, high modulus, ultra high molecular weight polyethylene tape is described in detail in U.S. patent application Ser. No. 11/787,094, filed on Apr. 13, 2007, which has been incorporated herein by reference. The top sheet 460 of adhesive-coated unitape is oriented at 90° with respect to the bottom sheet 462. An adhesive layer 468, shown as a transparent layer of adhesive in FIGS. 10 and 11, is bonded to each sheet 460 and 462 in the manner described above. As the adhesive is thermoplastic, the two sheets 460 and 462 of adhesive-coated unitape are pressed together with heat and pressure which causes the two sheets to bond together into a cross-plied sheet of non-fibrous, high modulus, ultra high molecular weight polyethylene UHMWPE with the bonded sheets cross-plied in the 0° and 90° direction.

To form a ballistic-resistant panel, cross-plied sheets of adhesive-coated non-fibrous, high modulus, ultra high molecular weight polyethylene were stacked until a stack of cross-plied non-fibrous, high modulus, ultra high molecular weight polyethylene of approximately 2.0 psf (pounds per square foot) was obtained. Several of the nominal 2.0 psf stacks were pressed at a pressure of 150 psi. The press cycle included 30 minutes at a temperature of 210° F. and cooling under full pressure to below 120° F. before release thereby forming ballistic-resistant panels of nominally 2.0 psf areal density.

The ballistic-resistant panels were then tested for ballistic resistance. Projectiles of 0.30 caliber FSP (Fragment Simulated Projectile) per MIL-P-46593A were fired at the 2.0 psf test panels to obtain ballistics properties of the panels bonded with adhesive. The velocities in fps (feet per second) at which 50% of the projectiles failed to penetrate the target ($V_{50}$) were determined per MIL-STD-662F. Data for the resultant ballistic-resistant panels formed at 150 psi are shown in Table 2.

TABLE 2

Data Results for Ballistic-resistant panels of UHMWPE Sheet formed with various adhesives at Molding Pressure 150 psi and Ballistic Test Results:

| Adhesive Description | Adhesive ID | Adhesive Weight (gsm) | Adhesive (wt %) | Areal Density (psf) | Average 0.30 Cal FSP $V_{50}$ (fps) |
|---|---|---|---|---|---|
| B1 sheet | Polyolefin | 3.10 | 5.7 | 2.0 | 1902 |
| | | | | | 1941 |
| | | | | | 2130 |
| | | | | | 2008 |

TABLE 2-continued

Data Results for Ballistic-resistant panels of UHMWPE Sheet formed with various adhesives at Molding Pressure 150 psi and Ballistic Test Results:

| Adhesive Description | Adhesive ID | Adhesive Weight (gsm) | Adhesive (wt %) | Areal Density (psf) | Average 0.30 Cal FSP $V_{50}$ (fps) |
|---|---|---|---|---|---|
| B1 tape | Polyolefin tape Made via Serial 11/881,863 | 3.10 | 5.7 | 2.0 | Ave. 1995 1925-1950 |
| Dyneema HB25 fiber | Polyurethane | - | - | 2.0 | 2192 |

The $V_{50}$ results suggest that all of the test panels were acceptable for ballistic resistance of 0.30 caliber fragment simulated projectiles.

As the invention has been described, it will be apparent to those skilled in the art that the same may be varied in many ways without departing from the spirit and scope of the invention. Any and all such modifications are intended to be included within the scope of the appended claims.

What is claimed is:

1. A ballistic-resistant panel comprising a plurality of bonded, interleaved and angularly disposed layers of non-fibrous ultra high molecular weight polyethylene tape, said layers bonded together through the application of heat of at least 150 degrees F. and pressure of at least 150 psi;
   each of said layers of non-fibrous ultra high molecular weight polyethylene tape comprising a plurality of tape strips of indeterminate length having a modulus of greater than 1,400 grams per denier and longitudinally joined together in a sheet structure;
   said sheet structure includes partially overlapped or abutted strips of non-fibrous, ultra high molecular weight polyethylene tape that are bonded with heat and pressure to define joints between adjoining strips wherein said joints include a higher strength and higher modulus than the portions of the sheet outside the joints; and
   said plurality of tape strips joined together by calendering an array of said overlapped or abutted strips at a temperature between 120° C. and 155° C. and at a pressure of at least 300 pounds per lineal inch (pli) and under a tension of between 0.3 grams/denier and 5 grams/denier.

2. The ballistic-resistant panel of claim 1 wherein the plurality of tape strips joined together in a sheet structure comprises partially overlapped or abutted strips of non-fibrous ultra high molecular weight polyethylene tape that define joints between adjoining strips wherein the thickness of the joints is no more than 80% of the sum of the thicknesses of the adjoining strips that make up the joint.

3. The ballistic resistant panel of claim 1 further including a single layer of adhesive between the layers of non-fibrous, ultra high molecular weight polyethylene tape.

4. The ballistic resistant panel of claim 3 wherein the adhesive is selected from the group consisting of: polyamide, ethylene vinyl acetate, polyurethane, ethylene acrylic acid, polyolefin and polystyrene isoprene copolymer adhesives.

* * * * *